United States Patent Office 3,234,133
Patented Feb. 8, 1966

3,234,133
GREASE COMPOSITION
Max J. Wisotsky, University Park, Pa., Alfred H. Ellison, Fishkill, and Norman R. Odell, Wappingers Falls, N.Y., assignors to Texaco Inc., New York, N.Y., a corporation of Delaware
No Drawing. Filed Dec. 27, 1962, Ser. No. 247,545
10 Claims. (Cl. 252—49.6)

This invention relates to pigment-thickened lubricating greases having improved yield characteristics.

In commonly assigned U.S. 2,880,177 there is disclosed high temperature grease compositions consisting essentially of lubricating oils thickened with particular compounds of a class of high melting point temperature diazotized benzidine derivatives.

It has now been found that the incorporation of a minor amount of a fluorocarbon alcohol as a yield improving agent to the diazotized benzidine pigment thickened oleaginous silicone polymer fluid results in an unexpected improvement in the consistency value of the resulting grease composition.

In accordance with the present invention, the grease compositions comprise a chlorophenyl silicone polymer base fluid having a viscosity in the lubricating oil range thickened to a grease consistency with a thickening agent consisting essentially of a diazotized benzidine pigment having the general formula:

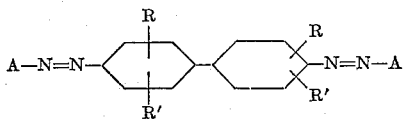

wherein A is selected from the group consisting of acylacetarylamide and N-arylpyrazolone radicals and their substituted derivatives, and wherein R and R' are hydrogen atoms or methyl, methoxy or chlorine substituents. The acylacetarylamide or N-arylpyrazolone radical portion of the benzidine pigment may contain substituents of various types such as, for example, alkyl, aryl, alkaryl, aralkyl groups or groups represented by the following formulas: —OR″, —COOR″, —OH, —NO₂, —NHR″, —NR″R‴, halogens and the like, wherein R″ and R‴ represent alkyl or aryl groups, said grease composition containing a fluoroalkanol which is present in an amount sufficient to improve the yield of the resultant grease compositions.

As used in the specification and appended claims, the term "fluoroalkanol" is a compound having the formula:

$$H(CF_2-CF_2)_nCH_2OH$$

wherein $n$ is an integer from 3 to 7.

The silicone polymer base oil should comprise from about 51 to about 90%, preferably 60 to 75%, by weight of the composition.

The methylchlorophenyl silicone polymer base oil is a compound represented by the formula:

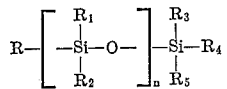

wherein R, $R_1$, $R_2$, $R_3$, $R_4$ and $R_5$ are methyl, phenyl or chlorinated phenyl groups, preferably at least about 35% of such groups being methyl groups and with sufficient chlorinated phenyl groups to give a chlorine content of at least about 3% by weight to the polymer, and $n$ is an integer of sufficient size to give a polymer having a viscosity in the lubricating oil viscosity range. The preferred silicone oils are those having a viscosity in the range from about 100 seconds to 600 seconds Saybolt Universal at 100° F., and containing about 4 to 12% by weight of chlorine. A particularly suitable material of this character is the commercial product sold under the trade name "Versilube F–50," having an average molecular weight of about 3,233, a viscosity of about 180 to 280 seconds Saybolt Universal at 100° F. and containing about 33.6% silicon and 7.18% of chlorine by weight, by analysis. Another suitable silicone polymer base fluid sold under the trade name "Dow F–60" can be used in the grease composition of the invention.

The methylchlorophenyl silicone polymer may be employed as the sole oil component, or it may be employed in admixture with minor amounts of other oils, particularly other synthetic oils, such as polyethers, polyglycols, diesters, polyesters or mixtures of such oils.

The diazotized benzidine thickening component should be present in the composition in an amount of from about 9 up to about 46.5 parts by weight of pigment, based on the weight of the composition. It is preferred that the diazotized benzidine pigment thickening agent be present in the grease composition in an amount between about 20 and 40%, particularly between 22 and 39%, by weight.

Suitable pigment components for the grease composition are either commercially available or readily obtainable by well known methods involving diazotizing benzidine or a substituted benzidine and then coupling the diazotized product with a suitable acylacetarylamide or N-arylpyrazolone as described, for example, in German Patent 251,479 (1912).

These benzidine pigments are employed in finely divided form, ordinarily in the form of particles below about 1 micron in diameter, and preferably below about 0.5 micron in diameter, which may be obtained either by suitably controlling the crystallization conditions during the preparation or by fine grinding. The above class of pigments include the familiar Benzidine Yellows and the Vulcan Fast Reds, which are employed extensively as rubber pigments.

Suitable commercially available compounds include the following pigments: bis(acetyl-N-phenylcarbamylmethyl) 4,4′ - disazo-3,3′-dichlorodiphenyl, bis(acetyl-N-methoxyphenylcarbamylmethyl) 4,4′-disazo-3,3′-dichlorodiphenyl, bis(acetyl - N - phenylcarbamylmethyl) 4,4′-disazo-3,3′-dimethyldiphenyl, bis(1 - phenyl-3-methyl-5-keto-4-pyrazolinyl) 4,4′ - disazo-3,3′-dimethoxydiphenyl and bis(1-phenyl - 3 - methyl-5-keto-4-pyrozolinyl) 4,4′-disazo-3,3′-dichlorodiphenyl. Particularly preferred pigments include bis(acetyl-N-phenylcarbamylmethyl) 4,4′-disazo-3, 3′-dimethyldiphenyl and bis(1-phenyl-3-methyl-5-keto-4-pyrozolinyl) 4,4′-disazo-3,3′-dimethoxydiphenyl.

The yield improving agent of the grease composition is present therein in a minor amount of 0.5 to 3 percent, and consists of a fluorocarbon alcohol containing 7 to 15, preferably about 9 to 13 carbon atoms therein and preferably from about 16 to 24 fluorine atoms.

Suitable fluorocarbon alcohol include alpha, alpha, omega trihydrododecafluoro - 1 - heptanol, alpha, alpha, omega trihydrohexadecafluoro-1-nonanol, alpha, alpha, omega trihydroeicosafluoro - 1 - undecanol, alpha, alpha, omega trihydrotetracosafluoro-1-tridecanol and alpha, alpha, omega trihydrooctacosa-1-pentadecanol and mixtures thereof.

A particularly preferred fluorocarbon alcohol is an alpha, alpha, omega eicosafluoro-1-undecanol. It is preferred that the fluorocarbon alcohol be used in amounts between about 1 and 2 percent by weight.

The grease compositions of the invention can also contain minor amounts, i.e., 0.5 to 10 percent by weight of the composition, of oxidation inhibitors, corrosion inhibitors, stringiness agents, tackiness agents, lubricity agents, coloring materials and the like.

Suitable oxidation inhibitors include aryl amines such as diphenylamine, alpha- as well as beta-naphthylamine, para-phenylenediamine and N,N' - diphenyl-p-phenylaminediamine. Satisfactory corrosion inhibitors include for example, lead naphthenate, sarcosine, N-acyl sarcosines and particularly N-cocoyl sarcosine, wherein cocyl represents coconut fatty acids.

The grease compositions of the present invention can be prepared in a known manner such as by intimately mixing the pigment and the fluorocarbon alcohol components together and then blending the resulting admixture with the silicone polymer base oil in a colloid mill to obtain a thorough dispersion of the pigment and the fluorocarbon alcohol in the silicone oil. An alternate procedure is to blend all of the components together with continuous mixing. The mixing operation can be carried out at ordinary or elevated temperatures up to about 300° F. Corrosion and oxidation inhibitors can be added to the admixed composition in a conventional manner and mixing continued followed by milling to produce a uniform grease composition.

Example 1

A grease composition was prepared from an admixture of a chlorophenyl silicone polymer oil, Versilube F-50, a diazotized benzidine pigment consisting of bis(1-phenyl-3 - methyl-5-keto-4-pyrazolinyl) 4,4'-disazo-3,3'-dimethoxydiphenyl and a fluoroalkanol mixture consisting of about 85% by weight of alpha, alpha, omega trihydroeicosafluoro-1-undecanol, 13 percent of an isomeric fluoro-secondary alkanol and 2 percent of homologous fluoroalkanols prepared by the telomerization of tetrafluoroethylene with methanol as shown in U.S. 2,559,628.

The grease composition was prepared in the following manner:

There was admixed in a grease kettle provided with an electric stirrer 900 parts of the pigment and 2050 parts of the silicone polymer oil at 180° F. The heated admixture was divided into a number of equal portions. There was added to 476 parts of one of the heated portions 4.81 parts of the $C_{11}$ fluoroalkanol with continued stirring. The resulting stirred admixture was milled through a Premier Colloid Mill having a rotor-stator clearance of 0.002 inch for two passes.

Example 2

A grease composition was prepared from an admixture of silicone polymer oil, Versilube F-50, a $C_{11}$ fluorocarbon alcohol and a diazotized benzidine pigment comprising bis(acetyl-N-phenylcarbamylmethyl) 4,4'-disazo-3,3'-dimethyldiphenyl and the fluoroalkanol of Example 1. The grease composition was prepared in a manner similar to that of the grease of Example 1 above, except that the oil and pigment were admixed at 180° F. and milled for two passes through the colloid mill; the fluorocarbon alcohol was added to the milled admixture, and the mixture milled for two additional passes through the colloid mill.

Control Example A and B

In a manner similar to that described in Examples 1 and 2 above, grease compositions were prepared using the components of Examples 1 and 2, respectively, except that no fluorocarbon alcohol components were used in these control examples.

The table below sets forth the percentage compositions of the greases of Examples 1 and 2 and the control examples and also records the result of physical tests performed on these greases.

TABLE

| | Ex. 1 | Control A | Ex. 2 | Control B |
|---|---|---|---|---|
| Component, wt. percent: | | | | |
| Base oil, Versilube F-50 | 68.8 | 69.5 | 69.3 | 70.0 |
| Pigment of Ex. 1 | 30.2 | 30.5 | | |
| Pigment of Ex. 2 | | | 29.7 | 30.0 |
| $C_{11}$ fluoroalkanol | 1.0 | | 1.0 | |
| Tests on Product— | | | | |
| Penetration:[1] | | | | |
| Unworked | 182 | 182 | 245 | 268 |
| Worked 60 strokes | 215 | 262 | 350 | 388 |
| NLGI Consistency | 3 | 2 | 0 | 0 |

[1] Converted to ASTM from ¼ cone, ¼ worker used.

Inspection of the data in the above table shows that the incorporation of a minor amount of a $C_{7-15}$ fluoroalkanol in a diazotized benzidine pigment silicon polymer oil improved the worked penetration values of the greases of Example 1. The resultant grease was a No. 3 grade grease. In contrast, the grease composition of Control Example A containing no fluoroalkanol was a No. 2 grade grease.

The data shown in the table for the grease composition of Example 2 further illustrates that the presence of a $C_{11}$ fluoroalkanol in a pigment thickened grease improved the worked penetration value of the grease and made it a No. 0 hard grade grease. It is to be noted that the grease composition of Control Example B above, which does not contain any fluoroalkanol component was also a No. 0 grade grease, but had a worked penetration value 38 points greater than that of the grease of Example 2 above which contained the $C_{11}$ fluoroalkanol.

The data in the table illustrate the unexpected advantages in yield resulting from the incorporation of a $C_{7-15}$ fluoroalkanol in a diazotized benzidine thickened silicone polymer oil.

We claim:

1. A lubricating grease composition comprising from about 51 to 90% by weight of a methylchlorophenyl silicone polymer oil of lubricating oil viscosity thickened to a grease consistency with from about 9 to 46.5 percent by weight of a thickening agent consisting essentially of a diazotized benzidine pigment having the formula:

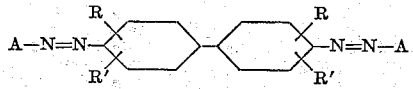

wherein A is selected from the group consisting of acylacetarylamide, N-arylpyrazolone and substituted acylacetarylamide and N-arylpyrazolone radicals, R and R' are selected from the group consisting of hydrogen, methyl, methoxy and chlorine, said grease composition containing a fluorocarbon alcohol having the formula

wherein $n$ is an integer from 3 to 7 therein, in an amount sufficient to improve the yield of the resulting grease composition.

2. A grease composition as claimed in claim 1 wherein the fluoroalkanol is present in an amount between 1 and 2 percent by weight.

3. A grease composition as claimed in claim 1, wherein said silicone polymer oil has a viscosity in the range of from about 100 to 600 seconds Saybolt Universal at 100° F., and contains between about 4 to 12 percent by weight of chlorine.

4. A grease composition as claimed in claim 1, wherein said diazotized benzidine pigment is bis(acetyl-N-phenylcarbamylmethyl) 4,4'-disazo-3,3'-dimethyldiphenyl.

5. A grease composition as claimed in claim 1, wherein said diazotized benzidine pigment is bis(1-phenyl-3-methyl-5-keto-4-pyrazolinyl) 4,4'-disazo-3,3'-dimethoxydiphenyl.

6. A grease composition as claimed in claim 1, wherein said fluoroalkanol is alpha, alpha, omega eicosofluoro-1-undecanol.

7. A grease composition as claimed in claim 1, wherein said fluorocarbon alcohol is a mixture of $C_{7-15}$ fluoroalkanols.

8. A grease composition as claimed in claim 1, containing about 0.5 percent by weight of a corrosion inhibitor and about 0.5 percent by weight of an oxidation inhibitor.

9. A grease composition as claimed in claim 1, comprising from 60 to 75 percent by weight of said silicone polymer oil thickened to a grease consistency with from 23 to 39 percent by weight of bis(acetyl-N-phenylcarbamylmethyl) 4,4'-disazo-3,3'-dimethyldiphenyl, and containing from about 1 to 2 percent by weight of alpha, alpha, omega eicosofluoro-1-undecanol.

10. A grease composition as claimed in claim 1 comprising from 60 to 75 percent by weight of said silicone polymer oil thickened to a grease consistency with a thickening agent comprising 20 to 39 percent by weight of bis(1-phenyl-3-methyl-5-keto-4-pyrazolinyl) 4,4'-disazo-3,3'-dimethoxydiphenyl, and containing from about 1 to 2 percent by weight of alpha, alpha, omega eicosofluoro-1-undecanol.

References Cited by the Examiner
UNITED STATES PATENTS

| | | | |
|---|---|---|---|
| 2,137,777 | 11/1938 | Lincoln et al. | 252—54 |
| 2,559,628 | 7/1951 | Joyce | 252—54 X |
| 2,880,177 | 3/1959 | Lyons et al. | 252—51.5 |
| 3,073,782 | 1/1963 | Humphrey et al. | 252—54 |
| 3,082,170 | 3/1963 | McCarthy et al. | 252—51.5 |

DANIEL E. WYMAN, *Primary Examiner.*

UNITED STATES PATENT OFFICE
CERTIFICATE OF CORRECTION

Patent No. 3,234,133                          February 8, 1966

Max J. Wisotsky et al.

It is hereby certified that error appears in the above numbered patent requiring correction and that the said Letters Patent should read as corrected below.

Column 2, line 28, for "22" read -- 23 --.

Signed and sealed this 10th day of January 1967.

(SEAL)
Attest:

ERNEST W. SWIDER                          EDWARD J. BRENNER
Attesting Officer                           Commissioner of Patents